US007958358B2

(12) United States Patent
Masui et al.

(10) Patent No.: US 7,958,358 B2
(45) Date of Patent: Jun. 7, 2011

(54) SCANNED IMAGE DISCLOSURE APPARATUS, METHOD AND STORAGE MEDIUM; ELECTRONIC MAIL TRANSMISSION APPARATUS, METHOD AND STORAGE MEDIUM; AND INTERNET FACSIMILE TRANSMISSION APPARATUS

(75) Inventors: Takanori Masui, Ebina (JP); Masato Sugii, Kawasaki (JP); Makoto Takada, Ebina (JP); Nobumi Kusano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1124 days.

(21) Appl. No.: 11/287,761

(22) Filed: Nov. 28, 2005

(65) Prior Publication Data
US 2007/0028097 A1  Feb. 1, 2007

(30) Foreign Application Priority Data
Jul. 26, 2005  (JP) .................. 2005-215901

(51) Int. Cl.
*H04L 9/32* (2006.01)
(52) U.S. Cl. .............. 713/175; 380/243; 380/245
(58) Field of Classification Search .......... 713/175; 380/243, 255
See application file for complete search history.

(56) References Cited

U.S. PATENT DOCUMENTS

| 6,128,740 A * | 10/2000 | Curry et al. ............ 713/158 |
| 7,426,639 B2 | 9/2008 | Ishiguro |
| 2002/0026578 A1 * | 2/2002 | Hamann et al. ............ 713/159 |
| 2002/0087479 A1 | 7/2002 | Malcolm |
| 2002/0184493 A1 * | 12/2002 | Rees ............ 713/158 |
| 2003/0110376 A1 | 6/2003 | Wiener et al. |
| 2006/0020808 A1 * | 1/2006 | Yachida et al. ............ 713/176 |
| 2006/0224895 A1 | 10/2006 | Mayer |
| 2006/0236097 A1 * | 10/2006 | Prologo et al. ............ 713/156 |
| 2009/0133107 A1 * | 5/2009 | Thoursie ............ 726/6 |

FOREIGN PATENT DOCUMENTS

| JP | 11098128 | 4/1999 |
| JP | 2001197055 | 7/2001 |
| JP | 2005502927 | 1/2005 |
| JP | 2005159726 | 6/2005 |
| WO | 200141360 | 6/2001 |
| WO | 2002080447 | 10/2002 |

OTHER PUBLICATIONS

Japanese Notice of Grounds for Rejection and English translation thereof, mailed on Mar. 9, 2010, in connection with Japanese Patent Application Serial No. 2005-215901.
Office Action issued on Aug. 11, 2010 in connection with corresponding U.S. Appl. No. 12/635,117.

* cited by examiner

*Primary Examiner* — Jason K Gee
(74) *Attorney, Agent, or Firm* — Gauthier & Connors LLP

(57) ABSTRACT

A scanned image disclosure apparatus has a disclosure unit that encrypts and discloses to a disclosure destination a scanned image by using a public key or a private key relating to a public key certificate that has been verified to be valid, a re-verification unit that judges whether or not re-verification of the validity of the public key certificate is necessary during execution for the disclosure unit and performs re-verification if it is judged to be necessary, a termination unit that terminates the execution for the disclosure unit if the public key certificate was judged to be invalid by the re-verification unit.

18 Claims, 3 Drawing Sheets

US 7,958,358 B2

SCANNED IMAGE DISCLOSURE APPARATUS, METHOD AND STORAGE MEDIUM; ELECTRONIC MAIL TRANSMISSION APPARATUS, METHOD AND STORAGE MEDIUM; AND INTERNET FACSIMILE TRANSMISSION APPARATUS

BACKGROUND OF THE INVENTION

1. Field of the Invention

The present invention relates to technology for encrypting communications data on the basis of a public key cryptosystem, and more particularly to technology for verifying the validity of public key certificates.

2. Description of the Related Art

In a public key cryptosystem, a public key certificate, such as one issued by a certification authority, is used to certify the validity of the public key. The public key certificate ordinarily specifies under a digital signature, such as from a certification authority, a signature public key and its term of validity so that a user (or software used by a user) can confirm that the public key is authentic or within the term of validity.

For example, when performing an encryption process for a digital signature or encryption on the basis of a public key cryptosystem in an electronic mail (e-mail), confirmation of the validity of the public key certificate is being performed the moment the user specifies a destination or issues a transmission command. In Microsoft Corporation's Outlook 2003 (registered trademark) e-mail software for personal computers (PC), the validity of a certificate is verified when the transmission command is issued.

In Outlook 2003, an e-mail with a public key certificate that has been verified is temporarily stored in an outbox tray before being transmitted to a destination. Then, even if power to the PC is interrupted or a mail server becomes inoperable with the e-mail stored in the outbox tray, the e-mail that is stored in the outbox tray is transmitted after normal operation is restored. Thus, it is possible for a problem to occur where the term of validity of the public key certificate expires during the period before normal operation is restored.

This problem also occurs in Internet facsimile, which combines facsimile and e-mail. In Internet facsimile, if a transmission job is not completed, such as due to an interruption of power to a device, it is executed as a recovery job after normal operation is restored. This results in the transmission of a digitally signed e-mail or an encrypted e-mail relating to an expired public key certificate. Furthermore, a similar problem may occur in Internet facsimile if the transmission command is performed by specifying a transmission time.

Generally, if encryption is performed on the basis of an expired public key certificate, an error is generated at the destination and the purpose of the transmission becomes impossible to achieve. Furthermore, in this case, wasteful processes are performed at the originator and at the destination. Moreover, from a security point of view, it is not desirable to use an expired public key certificate.

SUMMARY OF THE INVENTION

A scanned image disclosure apparatus includes a disclosure unit that encrypts and discloses to a disclosure destination a scanned image by using a public key or a private key relating to a public key certificate that has been verified to be valid, a re-verification unit that judges whether or not re-verification of the validity of the public key certificate is necessary during execution for the disclosure unit and performs re-verification if it is judged to be necessary, and a termination unit that terminates the execution for the disclosure unit if the public key certificate was judged to be invalid by the re-verification unit. As used herein, disclosure refers to transmitting data to an external device or allowing data to be viewed from an external device, such as e-mail transmissions or uploading data to a server.

One embodiment of the method of the present invention includes a disclosure step for encrypting and disclosing to a disclosure destination a scanned image by using a public key or a private key relating to a public key certificate that has been verified to be valid, a re-verification step for judging whether or not re-verification of the validity of the public key certificate is necessary during execution of the disclosure step and performing re-verification if it is judged to be necessary, and a termination step for terminating the execution of the disclosure step if the public key certificate was judged to be invalid in the re-verification step.

In one embodiment of the storage medium of the present invention a program for executing on a computer includes a disclosure step for encrypting and disclosing to a disclosure destination a scanned image by using a public key or a private key relating to a public key certificate that has been verified to be valid, a re-verification step for judging whether or not re-verification of the validity of the public key certificate is necessary during execution of the disclosure step and performing re-verification if it is judged to be necessary, and a termination step for terminating the execution of the disclosure step if the public key certificate was judged to be invalid in the re-verification step.

An e-mail transmission apparatus of the present invention includes a transmission unit that encrypts and transmits an e-mail by using a public key or a private key relating to a public key certificate that has been verified to be valid, a re-verification unit that judges whether or not re-verification of the validity of the public key certificate is necessary during execution for the transmission unit and performs re-verification if it is judged to be necessary, and a termination unit that terminates the execution for the transmission unit if the public key certificate was judged to be invalid by the re-verification unit.

An Internet facsimile transmission apparatus includes a unit that attaches a scanned image to an e-mail, a transmission unit that encrypts and transmits the e-mail by using a public key or a private key relating to a public key certificate that has been verified to be valid, a re-verification unit that judges whether or not re-verification of the validity of the public key certificate is necessary during execution for the transmission unit and performs re-verification if it is judged to be necessary, a termination unit that terminates the execution for the transmission unit if the public key certificate was judged to be invalid by the re-verification unit. The encryption process in the transmission unit performs encryption on the scanned image or performs encryption on the e-mail including the scanned image.

One embodiment of the method of the present invention includes a transmission step for encrypting and transmitting an e-mail by using a public key or a private key relating to a public key certificate that has been verified to be valid, a re-verification step for judging whether or not re-verification of the validity of the public key certificate is necessary during execution of the transmission step and performing re-verification if it is judged to be necessary, and a termination step for terminating the execution of the transmission step if the public key certificate was judged to be invalid in the re-verification step.

In one embodiment of the storage medium of the present invention a program for executing on a computer includes a transmission step for encrypting and transmitting an e-mail by using a public key or a private key relating to a public key certificate that has been verified to be valid, a re-verification step for judging whether or not re-verification of the validity of the public key certificate is necessary during execution of the transmission step and performing re-verification if it is judged to be necessary and a termination step for terminating the execution of the transmission step if the public key certificate was judged to be invalid in the re-verification step.

BRIEF DESCRIPTION OF THE DRAWINGS preferred embodiments of the present invention will be described in detail based on the following figures, wherein.

DETAILED DESCRIPTION OF THE INVENTION

The embodiments will be described by taking as an example a multifunction machine that is equipped with an Internet facsimile function. It should be noted, however, that the present invention is not limited to this example and can also be widely implemented in PCs and other computers.

Figure 1:
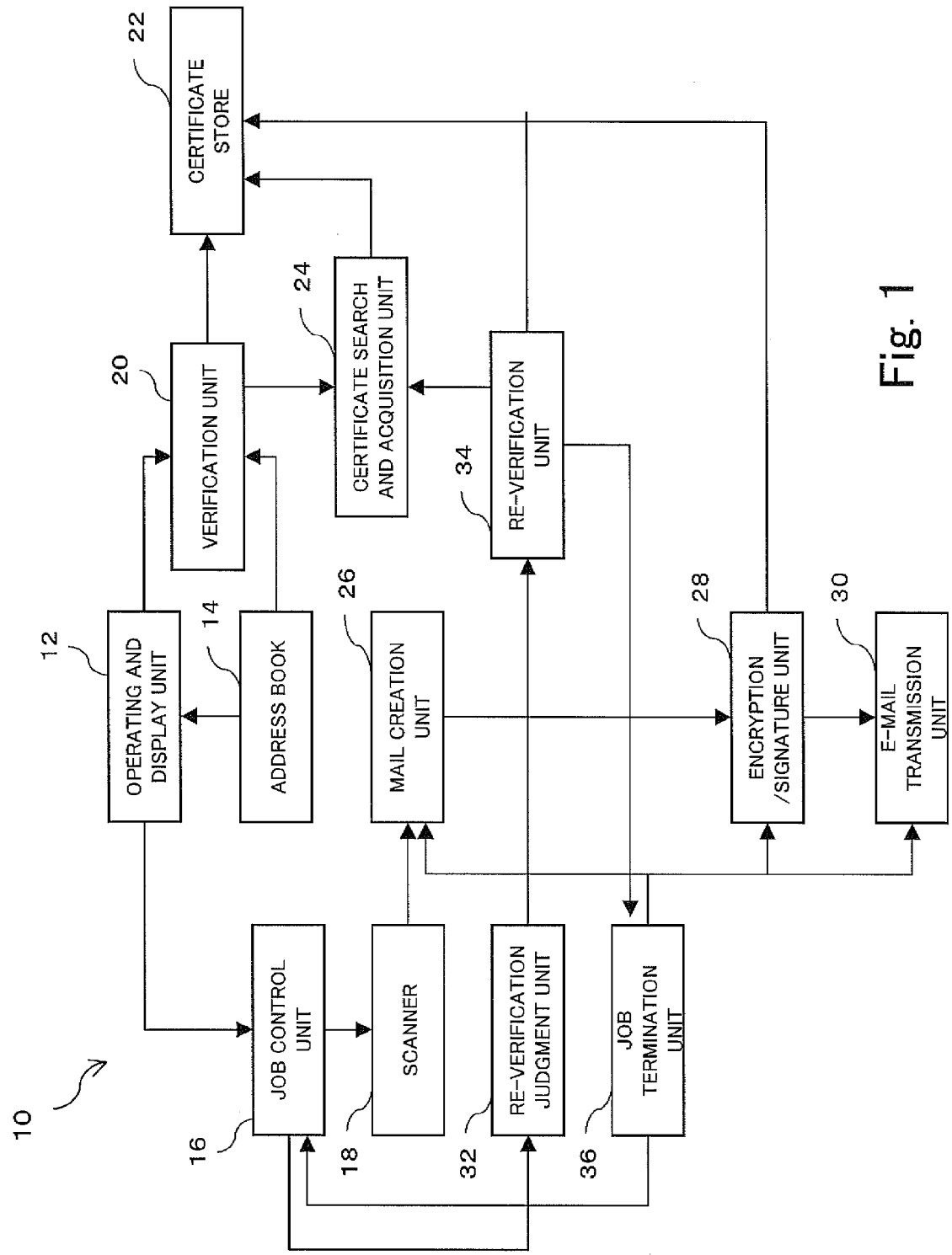
FIG. 1 is a block diagram showing an example configuration of a multifunction machine.

FIG. 1 is a schematic block diagram showing a configuration of a multifunction machine 10. The multifunction machine 10 is composed of hardware that is equipped with a scanner and an arithmetic processing unit and that is operated and controlled by a program. The multifunction machine 10 is provided with an operating and display unit 12 as a user interface that is composed of a panel through which a user inputs commands and a display device on which results are displayed to the user. When a user desires to transmit an Internet facsimile, the user inputs a transmission command after specifying a destination and performing an encryption process from the operating and display unit 12. The destination can be specified by selecting an e-mail address that has been registered in an address book 14.

A job control unit 16 is configured to control the processing flow of the multifunction machine 10 in accordance with program settings. A user command that is received at the operating and display unit 12 is sent to the job control unit 16 and processed at a predetermined time. A scanner 18 optically scans a paper document, drawing, or photograph. The job control unit 16 actuates the scanner 18 from an input from the operating and display unit 12 to generate a scanned image.

A verification unit 20 performs verification of a public key certificate corresponding to a public key or a private key that is required in the encryption processing and input from the operating and display unit 12. A certificate store 22 stores public key certificates corresponding to e-mail addresses of the sender and destinations that have been registered in the address book 14. A public key certificate is generally issued for every e-mail address (or may be issued for every device) and certifies the validity of a public key in the e-mail address. The verification unit 20 reads information from the address book 14 regarding the destination or the sender and compares it with the corresponding public key certificate in the certificate store 22. The content of the public key certificate is compared with the current time to verify whether the term of validity has expired.

If the validity of the public key certificate is confirmed, creation and transmission of the e-mail are performed, and if the public key certificate is judged to be invalid, the creation and transmission of the e-mail are terminated. However, if a valid public key certificate can be separately acquired at this point, it would be convenient to replace the public key certificate and continue the process. A certificate search and acquisition unit 24 is used in this case and sends an inquiry, such as to a certification authority, acquires a valid public key certificate, and stores it in the certificate store 22.

As a configuration for transmitting e-mail, the multifunction machine 10 is provided with a mail creation unit 26, an encryption/signature unit 28, and an e-mail transmission unit 30. The mail creation unit 26 is set with a destination that was input and creates an e-mail that has been attached with a scanned image, which was sent from the scanner 18. With respect to the created e-mail, the encryption/signature unit 28 performs, on the basis of user settings, an encryption process using a public key of the destination, a digital signature process by using a private key of the sender, or both processes. The encrypted e-mail is transmitted through an external communication path, such as network, by the e-mail transmission unit 30.

A re-verification judgment unit 32 and a re-verification unit 34 are provided for performing re-verification of a public key certificate. The re-verification judgment unit 32 judges whether re-verification of the public key certificate is necessary on the basis of the job control status at the job control unit 16. Examples of conditions for judging that re-verification by the re-verification judgment unit 32 is required are when an executing mail transmission process is in accordance with a recovery job or when the job is specified with a transmission time. Here, a recovery job refers to an incomplete job that is executed, such as after recovering from a shutdown of the multifunction machine 10. Furthermore, a job specified with a transmission time refers to a job that was generated after being specified so that a transmission is performed at an appropriate time in the future from the current time when the user issues a transmission command. When there is a command from the re-verification judgment unit 32 to the effect that re-verification should be performed, the re-verification unit 34 references the certificate store 22 and performs re-verification of the public key certificate. Namely, it is judged whether or not the public key certificate is valid by comparing the term of validity indicated in the public key certificate with the current time.

A job termination unit 36 terminates the transmission of an e-mail when its public key certificate has been judged to be invalid by the re-verification unit 34. More specifically, a process termination signal is transmitted to one or all of the mail creation unit 26, the encryption/signature unit 28, and the e-mail transmission unit 30 to terminate the transmission of the e-mail. Furthermore, in a state prior to a scan operation, the scan process can also be terminated by transmitting a command to the job control unit 16.

If it has been judged that a public key certificate is invalid, an attempt can be made to acquire a new public key certificate with the certificate search and acquisition unit 24. In this case, if it was possible to acquire a new and valid public key certificate, the transmission process for the e-mail is re-executed by using the public key certificate.

Next, the operational flow of the multifunction machine 10 shown above will be described using FIG. 2 and FIG. 3.

Figure 2:
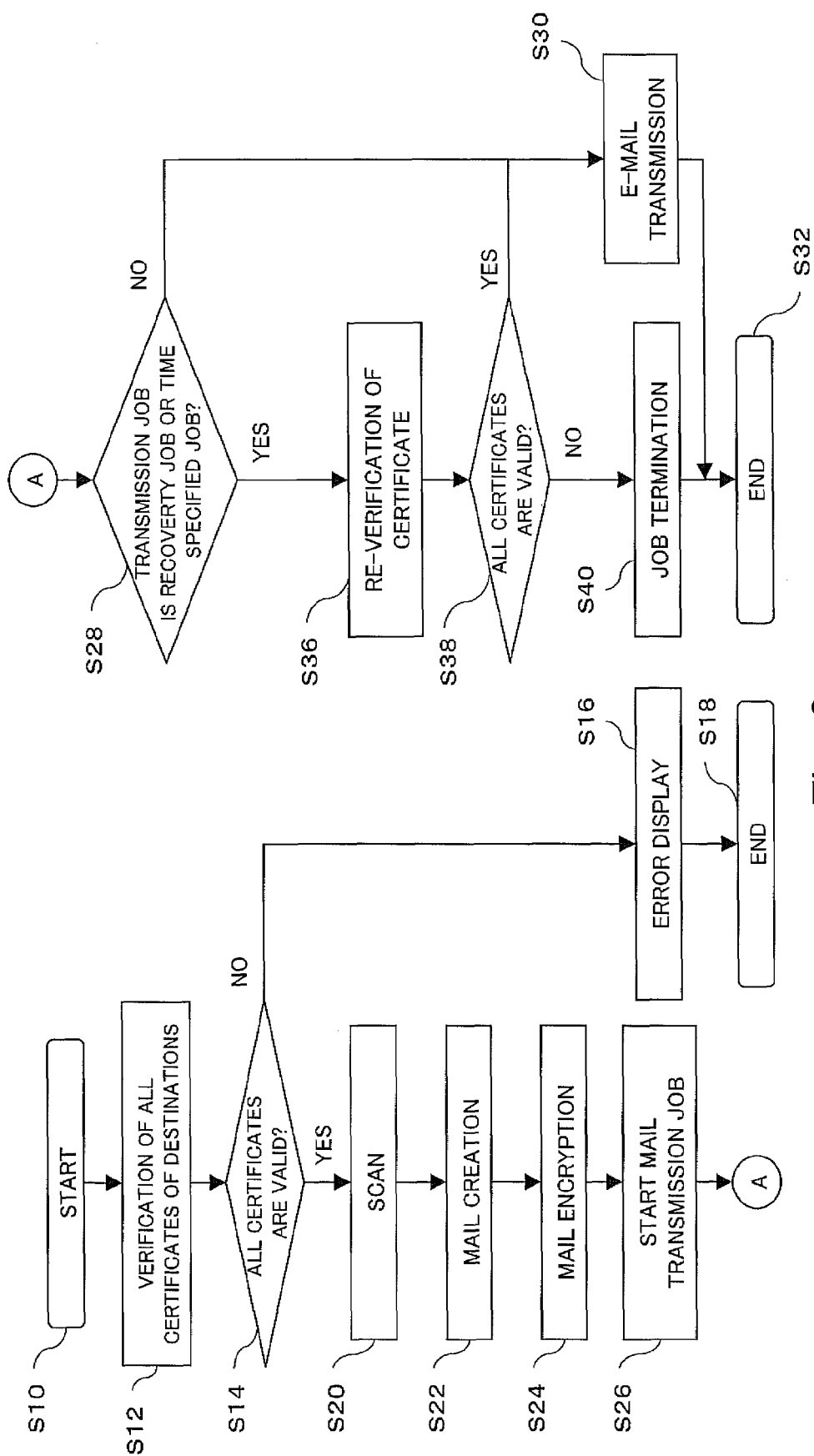
FIG. 2 is a flowchart illustrating an example procedure for performing encryption.

FIG. 2 illustrates one embodiment where an e-mail is encrypted. A user operates the operating and display unit 12 to specify destinations (addresses) and set the encryption. When the user presses the transmission command button for the Internet facsimile, a corresponding process in the multifunction machine begins (S10). In this process, verification (S12) of the public key certificate is first performed in the verification unit 20 for all specified destinations, and all certificates are judged for validity (S14).

As the result of the judgment, if there is even one certificate that has been judged to be invalid, an error is displayed (S16) on the operating and display unit 12 and the process terminates (S18). In contrast, if all certificates were judged to be valid, a scan operation by the scanner 18 is executed (S20) and a mail that has been attached with the scanned image is generated (S22) in the mail creation unit 26. Then, in the encryption/signature unit 28, encryption is performed (S24) by using the public key of the destination that was stored in the certificate store 22. The encrypted e-mail is transmitted to the e-mail transmission unit 30 and a mail transmission job is started (S26).

If the multifunction machine 10 shuts down at this time, the mail transmission terminates without completion. The multifunction machine 10 is provided with a function to execute the incomplete job as a recovery job when normal operation is restored.

The re-verification judgment unit 32 judges whether the started mail transmission job is a recovery job or a job relating to a time specified transmission (S28). If the started mail transmission job corresponds to neither, the transmission of the e-mail is performed (S30) and the process terminates (S32). In contrast, if the started mail transmission job corresponds to either or both, the re-verification unit 34 re-verifies (S36) whether or not the public key certificate for the destination is currently valid. As a result, if the public key certificates for all destinations are valid, the transmission of the e-mail is performed (S30), and if even one invalid public key certificate is detected, the job termination unit 36 terminates the transmission of the e-mail (S40) and terminates the process (S32). The termination of the job is recorded as a log and the user is informed through the operating and display unit 12.

Figure 3:
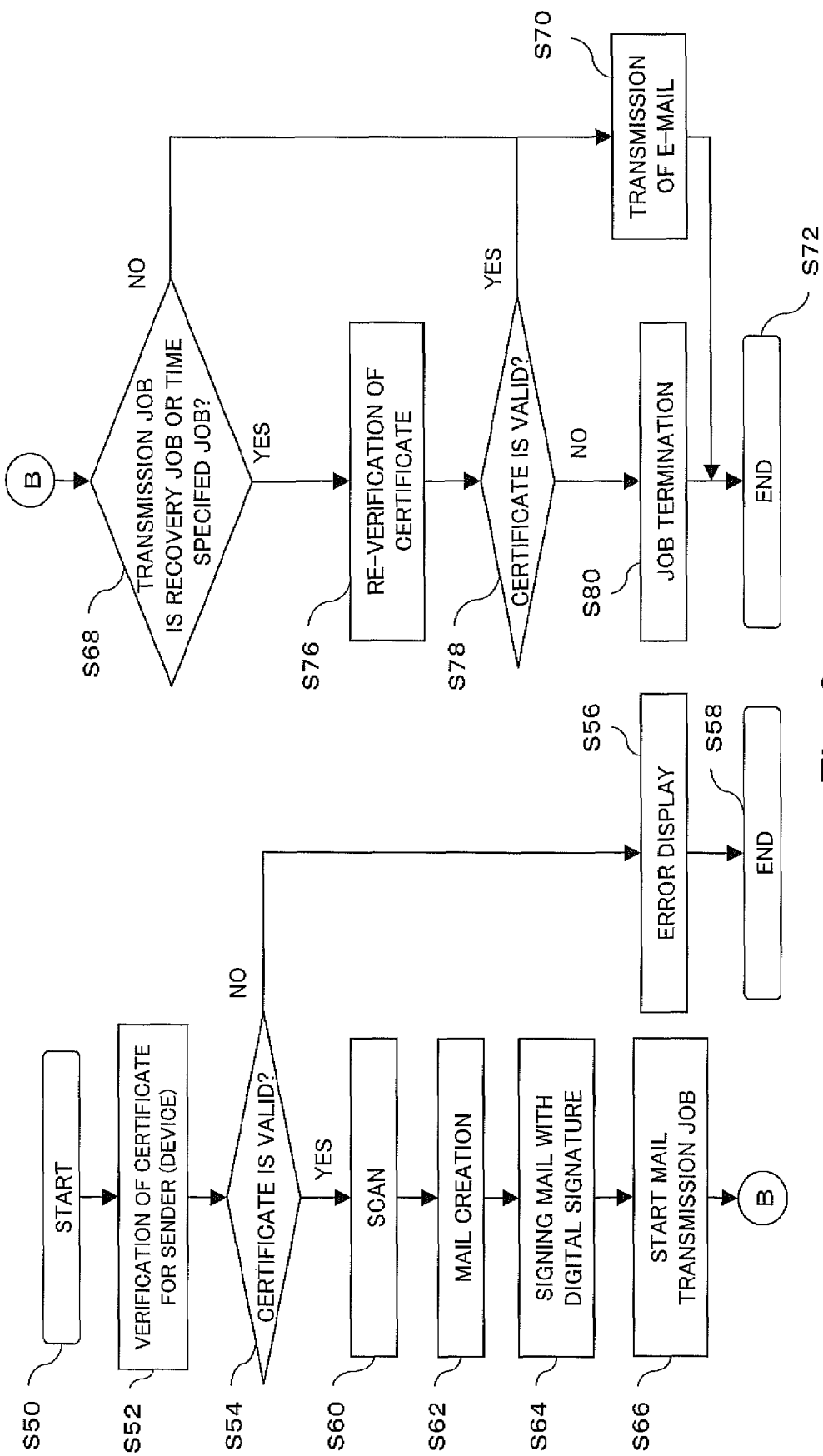
FIG. 3 is a flowchart illustrating an example procedure for signing an e-mail with a digital signature.

Next, an example of the processing flow will be described using FIG. 3 for a case where an e-mail is signed with a digital signature. The basic processing flow is substantially identical to that shown in FIG. 2 and the description of the duplicate portions will be omitted for simplicity.

In the multifunction machine 10, the user operates the operating and display unit 12 to specify a destination (address) and set a digital signature. When the user presses the transmission command button for the Internet facsimile, the process begins (S50). In the verification unit 20, the validity of the public key certificate for the sender (or device representing the sender) is verified (S52). As a result, if the public key certificate is invalid, an error is displayed (S56) on the operating and display unit 12 and the process terminates (S58), and if the public key certificate is valid, a scan operation (S60) by the scanner 18 and mail creation (S62) by the mail creation unit 26 are performed. Then, the encryption/signature unit 28 signs the created e-mail with a digital signature (S64) by using the private key of the sender and a mail transmission job starts (S66) at the e-mail transmission unit 30.

Next, the re-verification judgment unit 32 judges whether or not the transmission job is at least one of either a recovery job or a time specified job (S68). As a result, if the transmission job does not correspond to either job, the transmission of the e-mail is performed (S70) and the process terminates (S72), and if it corresponds to a job, the re-verification unit 34 performs re-verification (S76) to judge (S78) whether or not the public key certificate corresponding to the private key of the sender is valid. Then, if it is judged to be valid, the transmission of the e-mail is performed (S70), and if it judged to be invalid, the execution of the job is terminated (S80).

The embodiment described above is also applicable to data transmissions using a method other than e-mail. For example, in a case of uploading data using the https protocol that is utilized in web browsers, when the process is performed by a recovery job or a time specified job, performing re-verification of the public key certificate makes it possible to improve security and avoid wasted processing.

Next, various modifications of the embodiment of the present invention will be described.

In one embodiment of the present invention, the e-mail transmission apparatus is a device (computer) that is equipped with an e-mail transmission function. The e-mail transmission apparatus typically has a configuration as a transmitter-receiver that is also equipped with an e-mail reception function. Furthermore, it is also possible to include a variety of functions, such as an image processing function. This apparatus can be configured as a standalone hardware device or a system of multiple hardware devices. Moreover, the various functions in the apparatus are generally implemented by controlling hardware, which has arithmetic functions, through software (program). The transmission of e-mail is typically performed at the outset from a transmission command that is input on the basis of a transmission command that is input by a user or a program.

The transmission unit performs encryption on the e-mail and then its transmission. The encryption process is performed by using a public key that is certified by a public key certificate, which has been verified to be valid, or a corresponding private key. In the verification of validity, it is at least confirmed that the public key certificate is within the term of validity. This verification can be performed within the e-mail transmission apparatus, such as on the basis of the content of the public key certificate, and communication may be performed to increase the reliability of the verification, such as sending an inquiry to a certification authority or another device. It becomes possible to confirm whether or not the public key certificate has expired before the term of validity has elapsed, for example, by sending an inquiry to an external entity.

In the re-verification unit, the necessity of re-verification of a public key certificate is judged and re-verification is performed if it is judged to be necessary. Namely, if there are circumstances where the already performed verification of the validity of the public key certificate can be thought to be insufficient or the verification result can be thought to possibly vary, re-verification is performed. More specifically, examples can be given where a set time from the initial verification has elapsed or there was a notification of renewal or notification of expiration of the public key certificate after the initial verification or there was an interruption of power to the e-mail transmission unit after the initial verification. Re-verification is performed during the execution for the transmission unit. In other words, immediately prior to the execution of the encryption process or after execution of the encryption process but while transmission has not been performed, a judgment on the necessity of re-verification and re-verification are performed.

If the re-verification unit judges that a public key certificate is invalid, a termination unit terminates the execution for the transmission unit. The termination unit prevents the transmission of an e-mail that has undergone encryption processing on the basis of a public key certificate that has finally become invalid. Therefore, both the encryption process and the transmission may be terminated or an embodiment can be realized where the encryption process is performed but transmission is not performed.

According to this configuration, if the state changes and the public key certificate becomes invalid after the verification of the validity of the public key certificate is initially performed but before the actual transmission is performed, the transmission of the e-mail that was encrypted on the basis of that public key certificate can be prevented. For example, this configuration is effective if there is a delay until the actual transmission and if a long period has elapsed since the verification of the validity of the initial public key certificate. The transmission of an e-mail based on an invalid public key certificate is avoided to improve security and to make it possible to avoid an unnecessary transmission process at the e-mail transmission apparatus and an unnecessary reception process at the destination.

In one embodiment of the e-mail transmission apparatus of the present invention, the public key certificate certifies the public key of the destination for the e-mail and the encryption process at the transmission unit performs encryption of the e-mail using the public key. The encryption may be performed on the e-mail itself or on a partial component, such as an attached file, that is included in the e-mail.

In one embodiment of the e-mail transmission apparatus of the present invention, the public key certificate certifies the public key of the destination for the e-mail and the encryption process at the transmission unit signs the e-mail with a digital signature by using a corresponding private key. The digital signature may be signed on the e-mail itself or on a partial component, such as an attached file, that is included in the e-mail.

In one embodiment of the e-mail transmission apparatus of the present invention, when the destination of an e-mail is input or when the transmission command for an e-mail is input, a verification unit for verifying the validity of a public key certificate is provided and a public key or a private key used by the transmission unit is a public key or a private key relating to a public key certificate that was verified to be valid by the verification unit.

In one embodiment of the e-mail transmission apparatus of the present invention, the transmission unit executes the transmission of e-mail on the basis of a job process that commands the transmission of the e-mail and the re-verification unit judges that re-verification is necessary if an incomplete job is to be processed as a recovery job. Furthermore, in one embodiment of the e-mail transmission apparatus of the present invention, the transmission unit performs an execution on the basis of a transmission command that was input and the re-verification unit judges that re-verification is necessary if a predetermined time has elapsed from the time the transmission command was input. For example, in the case of a time specified job for performing a transmission command by specifying a future time for the transmission time, the time when the transmission command was input becomes different from the execution time of the transmission unit.

In one embodiment of the e-mail transmission apparatus of the present invention, a certificate acquisition unit that searches for and acquires, if the public key certificate is judged to be invalid by the re-verification unit, a valid public key certificate and a re-transmission unit that encrypts and transmits the e-mail by using a public key or a private key if a valid corresponding public key certificate was acquired by the certificate acquisition unit are provided. Namely, the certificate acquisition unit sends an inquiry, such as to a certification authority, as to the existence of a new public key certificate and acquires it, and the re-transmission unit performs the encryption process on the basis of the new public key certificate. For the execution of this operation, the user can be prompted for confirmation. However, the operation may be performed automatically, in which case it is possible to further omit the re-transmission operation by the user.

The Internet facsimile transmission apparatus of the present invention includes a unit for attaching a scanned image to an e-mail in addition to the function of the e-mail transmission unit. The encryption process in the transmission unit performs encryption on the scanned image or encryption on the e-mail including the scanned image. Internet facsimile is, for example, a communication system having functions for attaching a scanned image to an e-mail and transmitting it to a destination facsimile machine, a file (mail) storage box of a destination device, or a relay unit. The Internet facsimile transmission apparatus has a function to transmit an e-mail through Internet facsimile. The scanner, which generates scanned images, may be integrated in the Internet facsimile transmission apparatus or provided as a separate external unit. To ensure the received command is executed, a function is often provided in the Internet facsimile transmission apparatus to perform re-transmission as a recovery job after recovery from a power interruption. Furthermore, a user could easily turn off the power compared to a PC and there are situations where a recovery job is easily generated. Moreover, to achieve the level of security for Internet lines comparable that for telephone lines, encryption becomes essential. Thus, the necessity for performing re-verification of public key certificates further increases for a general e-mail transmission apparatus.

A scanned image disclosure apparatus of the present invention includes a disclosure unit that encrypts and discloses to a disclosure destination a scanned image by using a public key or a private key relating to a public key certificate that has been verified to be valid, a re-verification unit that judges whether or not re-verification of the validity of the public key certificate is necessary during execution for the disclosure unit and performs re-verification if it is judged to be necessary, and a termination unit that terminates the execution for the disclosure unit if the public key certificate was judged to be invalid by the re-verification unit.

Disclosure refers to transmitting data to an external device or allowing data to be viewed from an external device, such as e-mail transmissions or uploading data to a server. The disclosure is not limited to any protocol, and various protocols may be used, such as e-mail, FTP (File Transfer Protocol), HTTP (Hyper Text Transfer Protocol), and SMB (Server Message Block). In the disclosure unit, encryption is performed or a digital signature encryption process is performed on a scanned image and data is disclosed to a disclosure destination. The scanned image disclosure apparatus can be configured by standalone hardware, systemized hardware, or software controlled hardware in a manner similar to the above-mentioned e-mail transmission apparatus.

The entire disclosure of Japanese Patent Application No. 2005-215901 filed on Jul. 26, 2005 including the specification, claims, drawings, and abstract is incorporated herein by reference.

What is claimed is:
1. A scanned image disclosure apparatus comprising:
a disclosure unit that encrypts and discloses to a disclosure destination a scanned image by using a public key or a private key relating to a public key certificate that has been verified to be valid;
a re-verification unit that judges whether or not re-verification of the validity of the public key certificate is necessary during execution for the disclosure unit and performs re-verification when it is judged to be necessary; and a termination unit that terminates the execution for the disclosure unit when the public key certificate was judged to be invalid by the re-verification unit;

said disclosure unit performing an execution on the basis of a job that commands the disclosure of the scanned image;

said re-verification unit judging that re-verification is necessary when the job is a job which had verification of the validity of the public key certificate previously judged and is to be re-transmitted due to an interruption in the execution of the job such that the job is incomplete.

2. A scanned image disclosure apparatus according to claim 1, wherein:
the disclosure unit discloses the scanned image to a disclosure destination, which is a transmission destination, by attaching the scanned image to an e-mail.

3. A scanned image disclosure apparatus according to claim 1, wherein:
the public key certificate certifies a public key of the transmission destination of an email; and
the encryption process in the disclosure unit uses the public key to encrypt the e-mail.

4. A scanned image disclosure apparatus according to claim 1, wherein:
the public key certificate certifies a public key of a sender of an e-mail; and
the encryption process in the disclosure unit signs the e-mail with a digital signature by using a private key corresponding to the public key.

5. A scanned image disclosure apparatus according to claim 1, further comprising:
a verification unit that verifies the validity of the public key certificate when a disclosure destination of the scanned image has been input or when a disclosure command for the scanned image has been input;
the public key or the private key that is used by the disclosure unit is a public key or a private key relating to the public key certificate that has been verified to be valid by the verification unit.

6. A scanned image disclosure apparatus according to claim 1, wherein:
the disclosure unit performs an execution on the basis of a disclosure command that was input; and
the re-verification unit judges that re-verification is necessary when a predetermined time has elapsed from the time a disclosure command was input.

7. A scanned image disclosure apparatus according to claim 1, wherein an e-mail transmission apparatus comprises:
a certificate acquisition unit that searches for and acquires, when the public key certificate was judged to be invalid by the re-verification unit, a valid public key certificate; and
a re-disclosure unit that encrypts and discloses the scanned image by using a public key or a private key when a corresponding valid public key certificate was acquired by the certificate acquisition unit.

8. A method comprising:
encrypting, using an electronic device, a scanned image by using a public key or a private key relating to a public key certificate that has been verified to be valid;
disclosing the encrypted scanned image to a disclosure destination in response to a job that commands the disclosure of the scanned image;
judging whether or not re-verification of the validity of the public key certificate is necessary during execution of the disclosure and performing re-verification when it is judged to be necessary, re-verification being necessary when the job is a job which had verification of the validity of the public key certificate previously judged and is to be re-transmitted due to an interruption in the execution of the job such that the job is incomplete; and
terminating the execution of the disclosure when the public key certificate was judged to be invalid in the re-verification.

9. A computer-readable storage device storing a program for executing on a computer, the program comprising:
causing the computer to encrypt a scanned image by using a public key or a private key relating to a public key certificate that has been verified to be valid;
causing the computer to disclose the encrypted scanned image to a disclosure destination in response to a job that commands the disclosure of the scanned image;
causing the computer to judge whether or not re-verification of the validity of the public key certificate is necessary during execution of the disclosure and performing re-verification when it is judged to be necessary, re-verification being necessary if the job is a job which had verification of the validity of the public key certificate previously judged and is to be re-transmitted due to an interruption in the execution of the job such that the job is incomplete; and
causing the computer to terminate the execution of the disclosure when the public key certificate was judged to be invalid in the re-verification.

10. An e-mail transmission apparatus comprising:
a transmission unit that encrypts and transmits an e-mail by using a public key or a private key relating to a public key certificate that has been verified to be valid;
a re-verification unit that judges whether or not re-verification of the validity of the public key certificate is necessary during execution for the transmission unit and performs re-verification when it is judged to be necessary; and
a termination unit that terminates the execution for the transmission unit when the public key certificate was judged to be invalid by the re-verification unit;
said transmission unit performing an execution on the basis of a job that commands the transmission of the e-mail;
said re-verification unit judging that re-verification is necessary when the job is a job which had verification of the validity of the public key certificate previously judged and is to be re-transmitted due to an interruption in the execution of the job such that the job is incomplete.

11. An e-mail transmission apparatus according to claim 10, wherein:
the public key certificate certifies a public key of the transmission destination of the e-mail; and
the encryption process in the transmission unit uses the public key to encrypt the e-mail.

12. An e-mail transmission apparatus according to claim 10, wherein:
the public key certificate certifies a public key of a sender of the e-mail; and
the encryption process in the transmission unit signs the e-mail with a digital signature by using a private key corresponding to the public key.

13. An e-mail transmission apparatus according to claim 10, further comprising:
a verification unit that verifies the validity of the public key certificate when a transmission destination of the e-mail has been input or when a transmission command for the e-mail has been input;

the public key or the private key that is used by the transmission unit is a public key or a private key relating to the public key certificate that has been verified to be valid by the verification unit.

14. An e-mail transmission apparatus according to claim 10, further comprising:
the transmission unit that performs an execution on the basis of a transmission command that was input; and
the re-verification unit that judges that re-verification is necessary when a predetermined time has elapsed from the time the transmission command was input.

15. An e-mail transmission apparatus according to claim 10, further comprising:
a certificate acquisition unit that searches for and acquires, when the public key certificate is judged to be invalid by the re-verification unit, a valid public key certificate; and
a re-transmission unit that encrypts and transmits the e-mail by using a public key or a private key when a corresponding valid public key certificate was acquired by the certificate acquisition unit.

16. An internet facsimile transmission apparatus comprising:
a unit that attaches a scanned image to an e-mail;
a transmission unit that encrypts and transmits the e-mail by using a public key or a private key relating to a public key certificate that has been verified to be valid;
a re-verification unit that judges whether or not re-verification of the validity of the public key certificate is necessary during execution for the transmission unit and performs re-verification when it is judged to be necessary; and
a termination unit that terminates the execution for the transmission unit when the public key certificate was judged to be invalid by the re-verification unit;
the encryption process in the transmission unit performs encryption on the scanned image or performs encryption on the e-mail including the scanned image;
said transmission unit performing an execution on the basis of a job that commands the transmission of the e-mail;
said re-verification unit judging that re-verification is necessary when the job is a job which had verification of the validity of the public key certificate previously judged and is to be re-transmitted due to an interruption in the execution of the job such that the job is incomplete.

17. A method comprising:
encrypting, using an electronic device, by using a public key or a private key relating to a public key certificate that has been verified to be valid;
transmitting the encrypted e-mail in response to a job that commands the disclosure of the scanned image;
judging whether or not re-verification of the validity of the public key certificate is necessary during execution of the transmission and performing re-verification when it is judged to be necessary, re-verification being necessary when the job is a job which had verification of the validity of the public key certificate previously judged and is to be re-transmitted due to an interruption in the execution of the job such that the job is incomplete; and
terminating the execution of the transmission when the public key certificate was judged to be invalid in the re-verification.

18. A computer-readable storage device storing a program for executing on a computer, the program comprising:
causing the computer to encrypt by using a public key or a private key relating to a public key certificate that has been verified to be valid;
causing the computer to transmit the encrypted e-mail in response to a job that commands the disclosure of the scanned image;
causing the computer to judge whether or not re-verification of the validity of the public key certificate is necessary during execution of the transmission and performing re-verification when it is judged to be necessary, re-verification being necessary when the job is a job which had verification of the validity of the public key certificate previously judged and is to be re-transmitted due to an interruption in the execution of the job such that the job is incomplete; and
causing the computer to terminate the execution of the transmission when the public key certificate was judged to be invalid in the re-verification.

* * * * *